United States Patent [19]

Sakarcan

[11] Patent Number: 4,854,295

[45] Date of Patent: Aug. 8, 1989

[54] WEAR RESISTANT ABRASIVE CUTTING WHEEL

[75] Inventor: Metin Sakarcan, Kansas City, Mo.

[73] Assignee: Federal-Mogul Corporation, Southfield, Mich.

[21] Appl. No.: 201,646

[22] Filed: Jun. 1, 1988

[51] Int. Cl.$^4$ ............................................. B24D 5/06
[52] U.S. Cl. ................................. 125/15; 51/206 R; 51/206 P
[58] Field of Search ............. 125/15; 51/206 R, 206 P

[56] References Cited

U.S. PATENT DOCUMENTS

| | | |
|---|---|---|
| 2,808,044 | 10/1957 | Upper et al. . |
| 2,815,746 | 12/1957 | Schwarzkopf et al. . |
| 3,064,399 | 11/1962 | Anderson . |
| 3,128,755 | 4/1964 | Benson . |
| 3,201,902 | 8/1965 | Benson et al. . |
| 3,498,283 | 3/1970 | Cook . |
| 4,267,814 | 5/1981 | Benson et al. . |
| 4,291,667 | 9/1981 | Eichenlaub et al. . |
| 4,337,750 | 7/1982 | Dutcher . |
| 4,462,382 | 7/1984 | Baron et al. . |

*Primary Examiner*—Frederick R. Schmidt
*Assistant Examiner*—Maurina Rachuba
*Attorney, Agent, or Firm*—Lawrence J. Shurupoff

[57] ABSTRACT

A masonry blade adapted for cutting green concrete and asphalt reduces undercutting and extends blade life by generating turbulent flow within the swarf adjacent to the bond line between the cutting segments and the blade core. Turbulence is created by forming the leading surface of at least one of the cutting elements with a radial dimension greater than its trailing surface and greater than corresponding surfaces of standard elements. The opening of the blade gullets is maintained within predetermined limits to prevent blade vibration.

1 Claim, 2 Drawing Sheets

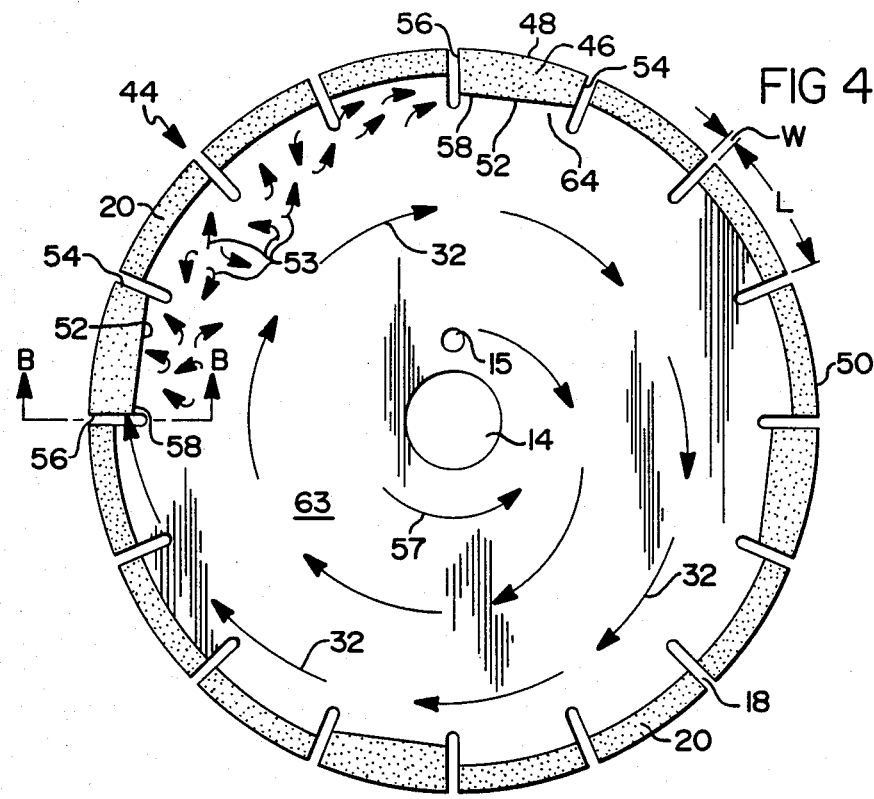
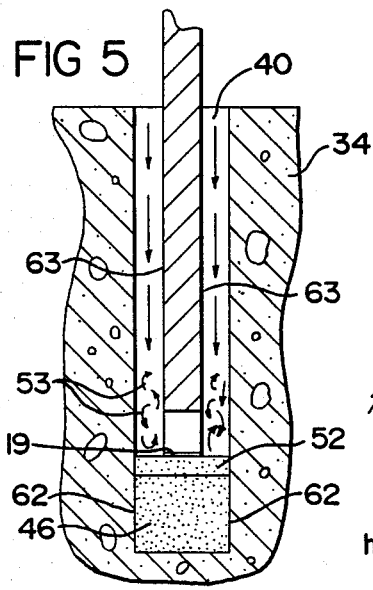
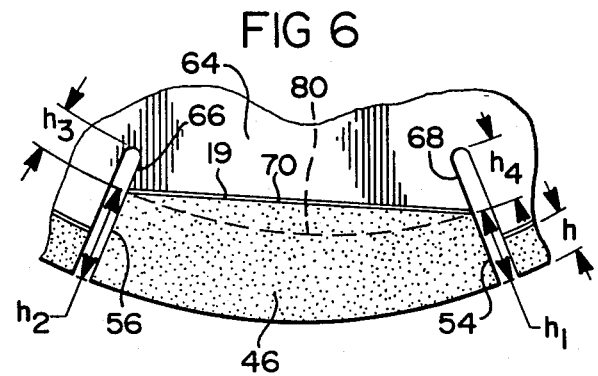

WEAR RESISTANT ABRASIVE CUTTING WHEEL

BACKGROUND OF INVENTION

1. Field of Invention

The present invention relates to abrasive saw blades or cutting wheels and specifically to industrial saw blades of the type formed by a circular sheet metal drive core having one or more cutting members containing disbursed diamond dust secured around the drive core periphery.

2. Description of Prior Developments

Industrial saw blades referred to as the discontinuous rim or segmented type blade are well-known and currently in widespread use. This type of blade is made by mounting to a circular core a series of short arcuate abrasive cutting segments containing diamond powder disbursed in a metal matrix. These cutting segments are usually about two inches long and are ordinarily silver soldered, brazed or welded to the rim of a steel core which has been divided into a plurality of support sections having peripheral surfaces for supporting the cutting segments.

The support sections are separated by radially extending gullets which accommodate the large thermal stresses created by the frictional heating of the blade periphery during cutting operations as well as the large thermal stresses created during the mounting of the cutting segments on the blade core during manufacture. Segmented blades have been accepted by those industries that subject the blades to heavy duty use, such as the concrete, asphalt and masonry cutting industries where rough abrasive cutting is commonplace.

For such rigorous applications, it is common to continuously flush the cutting area during the cutting operation with a fluid coolant in order to keep the blade as cool as possible. The coolant also serves to flush loose rock-like material, spent abrasive and the like from the cutting site, all of which in combination with the coolant is generally referred to in the art and throughout the description of the present invention as "swarf".

Even though construction of segmented blades has been developed to a high point of perfection, blades must commonly be replaced whenever the swarf erodes the steel drive core adjacent the junction of the cutting segments with the core. This erosion occurs radially inwardly of the cutting segments around the weld line between the segments and the core and is commonly referred to as "undercutting".

Undercutting is particularly bothersome because it significantly reduces blade life. Even though up to half of the original material of each abrasive cutting segment may remain, the entire blade must be replaced for reasons of safety. That is, if an undercut cutting segment breaks loose during use due to lack of core support, an undesirable condition results. Moreover, since the abrasive cutting segments are the most costly portion of the blade, significant economic loss is incurred by undercutting due to nonuse or waste of the remaining cutting segment material. In addition, frequent replacement of undercut blades further reduces productivity by increasing the down time spent replacing the blades.

Undercutting is particularly acute when "green" concrete is being cut. Green concrete is concrete in its relatively freshly poured state prior to curing. Curing or setting up can take from 4 to 60 hours to complete. During this time, the green concrete begins to shrink. If this shrinkage is not controlled, cracks will form throughout the concrete. In order to avoid this uncontrolled cracking, the green concrete must be cut or grooved to provide stress relief. These cuts and grooves are commonly referred to as contraction joints.

In practice, it is often difficult to accurately determine exactly when a particular pour of concrete has sufficiently cured to begin cutting. If a saw operator waits too long, excessive stresses will build up and cause cracking of the concrete. However, if the saw operator does not wait long enough, and excessive undercutting will result.

That is, if the green concrete is not sufficiently cured or set up prior to cutting, conventional cutting segments will pull or tear the sand and rock particles from the concrete matrix rather than cutting through or shearing these particles. This is known as spalling. When this occurs, a particularly acute undercutting condition results where relatively large quantities of abrasive sand and rock particles are forced into contact with the blade core.

At the same time, a ragged unsightly cut is produced due to the pulling and tearing of the rock and sand particles from the edges of the cut. This condition is known as raveling. Raveling is most pronounced when "aggressive" blades are used having wide gullets which allow the cutting segments to take large bites from the concrete.

Another drawback experienced with conventional segmented blades is the generation of excessive vibration. This vibration is frequently accompanied by high operating noise levels. An associated condition which accompanies blade vibration is a bucking or jerking of the blade away from the cutting surface. This reduces cutting rate, extends cutting time and is extremely annoying to the operator of the saw.

As the blade vibrates, its contact with the material being cut is disrupted. This intermittent contact prevents continuous cutting and thereby decreases cutting efficiency by increasing the time required to complete a given cut. Moreover, blade vibration increases the rate of cutting segment wear as the cutting segments intermittently hammer and pound against the material being cut. This type of intermittent impact causes rapid segment deterioration and wear.

Prior attempts to reduce undercutting by incorporating one or more radially recessed cutting elements between the remaining cutting elements resulted in increased blade vibration and wear. That is, the relatively large circumferential gap created by each recessed cutting element and the adjacent gullets results in a significant lack of circumferential contact between the material being cut and the remaining cutting elements. This condition creates a radially and circumferentially directed impulse on the leading face of the next cutting element as it enters the cut. In effect, the large gap created by prior radially recessed cutting elements allows the blade to "fall down" into the cut and requires the next cutting element to "lift up" the blade to continue cutting.

Accordingly, a need exists for a segmented type blade which reduces vibration, reduces undercutting and raveling and which allows for full use of the abrasive cutting segments by preventing premature wear adjacent the bond line formed between the blade core and the cutting segments.

SUMMARY OF INVENTION

The present invention has been developed to meet the needs noted above and therefore has as a primary object the provision of a segmented type abrasive cutting blade which is highly resistant to core undercutting and which allows full use of the costly abrasive cutting segments.

Another object of the invention is to reduce the amount of axial or transverse movement of the blade as it travels through the groove or cut in the material being abraded. This groove or cut is generally termed the kerf. Transverse blade movement within the kerf is undesirable as it results in blade vibration which, as indicated above, decreases blade efficiency.

Blade and cutting segment vibration is reduced according to the present invention by increasing the radial extent or radial dimension of at least one blade cutting segment to provide greater stability to the blade as it rotates within the kerf. This stability is achieved through the greater supportive contact and transverse restraint provided between the sides of the cutting segment and the walls of the kerf.

Vibration is further reduced by avoiding the use of radially recessed cutting elements and by limiting the gullet openings to relatively small values. The present invention preferably maintains a substantially continuous cutting action by locating the outer peripheral cutting surfaces of each and every cutting element along the circumference of a circle having its center coincident with the center of the blade core and by avoiding wide open aggressive gullets. This approach reduces both radial and transverse blade flexure and vibration.

Another advantage gained by increasing the radial dimension of at least one blade cutting segment is the resulting removal of swarf from the area bordering the bond between the cutting segment and the blade core. In effect, the increased radial extent of the cutting segment provides for an increased plowing action whereby the swarf adjacent to and in front of the cutting segment is pushed out of the kerf without contacting any of the following cutting segments or the blade core adjacent these segments. The swarf is also distributed over a larger surface area of the blade core so that the abrasion is diffused and thereby reduced.

Still another object of the invention is to disrupt the laminar flow characteristics of the swarf and to generate a turbulent swarf flow adjacent the cutting segments to further reduce core undercutting. This is achieved by forming the leading face of at least one specially configured cutting segment with a radially extending surface which impacts and changes the direction and character of swarf flow from a radially outwardly spiraling laminar flow to a generally randomly directed turbulent flow. Turbulence is further generated by the formation of a low pressure zone between the leading and trailing edges of the specially configured cutting segment.

Yet another object of the invention is to reduce wear about the outer leading edge of each cutting segment by limiting gullet width to a minimum. Large gullet openings have previously caused rapid cutting segment wear by allowing high impact forces to round off the leading edges of the cutting segments. This undesirable condition is commonly referred to as "bullet nosing."

The realization of these objects and various objects, features and attendant advantages of the present invention will be more fully appreciated from the following detailed description when considered in connection with the accompanying drawings in which the same reference numbers designate the same or corresponding parts throughout.

BRIEF DESCRIPTION OF DRAWINGS

In brief, the drawings include:

FIG. 4, which is a face view of a cutting wheel according to a preferred embodiment of the invention;

FIG. 5, which is a fragmentary sectional view of the wheel of FIG. 4 as taken along line B—B and shown in an operative mode disposed within a kerf;

FIG. 6, which is an enlarged fragmentary side elevation view of a preferred embodiment of a radially enlarged cutting element and its support segment.

DETAILED DESCRIPTION OF THE PREFERRED EMBODIMENTS

The present invention is preferably structured in a manner somewhat similar to that blade described in U.S. Pat. No. 4,705,017 to Lewis, the disclosure of which is incorporated herein by reference. However, the present invention varies in structure with respect to the Lewis blade in several critically different aspects concerning the relative dimensions and shape of one or more of the abrasive cutting segments and the width of the gullets. In order to fully appreciate the refinements of the present invention, the general features of the Lewis blade will first be discussed.

Figure 1:
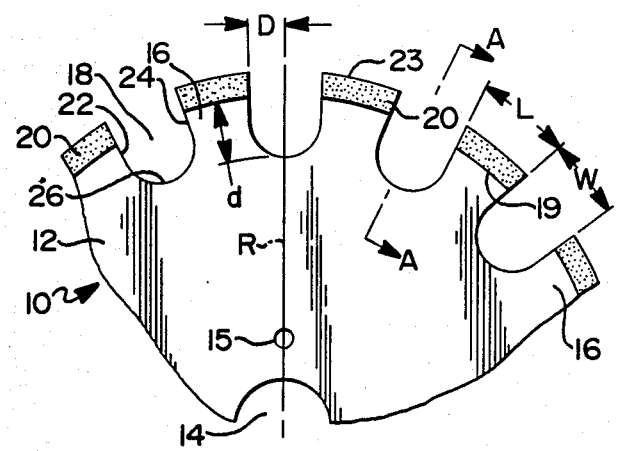
FIG. 1, which is a fragmentary face view of a cutting wheel according to one example of the prior art.
Figure 2:
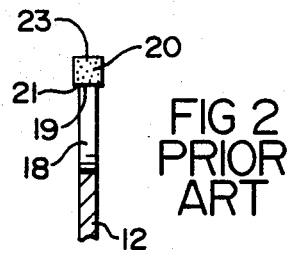
FIG. 2, which is a fragmentary radial cross section of the cutting wheel of FIG. 1 taken approximately on the line A—A thereof through a gullet.
Figure 3:
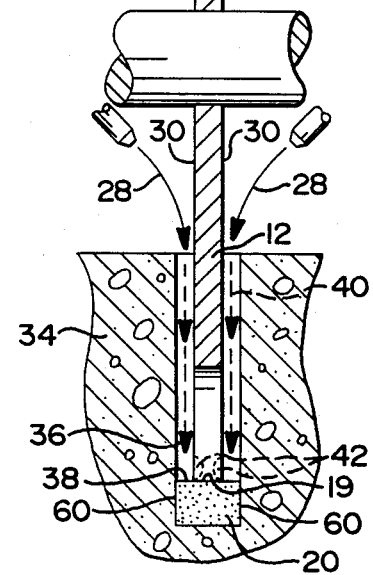
FIG. 3, which is a fragmentary sectional view of the cutting wheel of FIG. 1 seen in an operative mode disposed within a kerf.

FIGS. 1-3 illustrate an exemplary embodiment of a diamond abrasive blade or a cutting wheel according to the Lewis patent. The cutting wheel 10 generally includes a central sheet metal drive disk or blade core 12 made of suitable wrought metal, preferably steel. The core is formed with a central arbor hole 14 and an offset key hole 15 for respectively mounting and locking the blade on a rotating axially-extending shaft.

The outer periphery of the core 12 is segmented so as to form a plurality of support segments 16 and a gullet 18 between each adjacent pair of support segments. Upon a base or support surface 17 located at and defining the radial extremity of each support segment at a distance d from the bottom of each gullet there is bonded adjacent a bond or weld zone 19 a diamond filled cutting element 20. The support surfaces 17 define circular arcs having the center of the blade core as their centers of curvature. As viewed along the side face of the saw blade looking in an axial direction, the radial inner and outer peripheries 21, 23 of the cutting elements are all arcuate and lie along concentric circles.

The cutting elements 20 are composed of any suitable abrasive material such as a diamond grit imbedded and dispersed in a hard matrix material composed of, for example, a mixture of bronze and iron. As further seen in FIG. 2, the cutting elements 20 are generally rectangular in radial cross-section, as viewed in a circumferential direction, and have a slightly greater width in an axial direction than the width of core 12 so as to extend axially outwardly beyond the surfaces of the core 12 by a small equal amount at either side. The cutting elements 20 are wider than the body of the core 12 to provide clearance when cutting, thereby acting similar to the "set" on a wood or metal cutting saw blade.

The gullets shown in FIG. 1 are bounded and defined in part by opposed side faces 22 and 24 of each adjacent pair of support segments. Each pair of side faces 22 and 24 forms a generally U-shaped gullet with a semi-circular radius or other arcuate face portion 26 defined at the closed end of the gullet. The gullet is shown to be symmetrical about a line R radiating from the center of the blade through the gullet such that the distance D between one side face 22 and radial line R is generally equal to the distance between other side face 24 and the radial line R. The side faces 22 and 24 are generally straight lines that are parallel to the radius line R and hence to each other.

As seen in FIG. 3, a fluid coolant such as water 28 is injected along the side faces 30 of the blade core 12. Because the blade core is rapidly rotating, the water is centrifugally accelerated and hurled in a radially outwardly spiraling path as represented by directional arrows 32 in FIG. 4. As the water travels radially outwardly, it is mixed with the particles abraded from the material 34 (i.e. green concrete, asphalt etc.) as well as particles abraded from the cutting elements 20. This mixture forms a highly abrasive swarf slurry 36.

Since the velocity of the swarf increases as it is hurled radially outwardly, it reaches its maximum velocity and maximum abrasiveness adjacent the bond or weld zone 19 as it impinges upon the underside 38 of the cutting element 20. At the time of impact, the swarf is constrained within the kerf 40 in a highly energized laminar flow which strikes surface 38 in a near tangential direction. This type of highly pressurized laminar flow maximizes the undercutting of the blade core 12 directly adjacent surface 38.

Eventually, the blade core material is abraded away by the swarf so as to form a pair of opposed circumferentially extending C-shaped wear grooves 42 as shown in phantom in FIG. 3. When the depth of the wear grooves becomes excessive, the entire blade must be replaced to avoid the possibility of a cutting element 20 breaking away from the blade core 12. At the time of blade replacement, there is frequently a significant amount of material left on the cutting elements. Unfortunately, this material cannot be easily salvaged and is typically discarded along with the worn out blade core.

In order to reduce the blade core wear caused by the swarf 36 and to reduce blade flexure and vibration, the cutting wheel 44 shown in FIGS. 4 through 6 has been developed according to the present invention. The gullets, blade core and cutting elements according to the preferred embodiment of the present invention are substantially of the same configuration as in Lewis, except for the width, W, of the gullets and the configuration of one or more specially shaped cutting elements and support segments as described below.

A most significant feature of this improved blade design resides in the configuration of at least one specially designed cutting element 46 which reduces undercutting and reduces vibration and noise, while disrupting the laminar flow of the swarf. Cutting element 46 is preferably formed of the same materials as cutting segments 20, i.e. diamond powder disbursed in a metal matrix and has about the same length L of about two inches. While the outer circumference 48 of cutting element 46 is generally coincident with the circular circumference 50 defined by and between the remaining standard cutting elements 20, the underside 52 of cutting element 46 is radially skewed (i.e. sloped, beveled or asymmetrically aligned) with respect to circumference 50 and to the diameter of the blade core.

More particularly, cutting element 46 is shaped to act as a turbulence generator which disrupts laminar flow upon impact with the outwardly spiraling swarf. As best seen in FIGS. 4 and 5, by redirecting the flow of the swarf in a random pattern, the laminar flow pattern of the pressurized swarf which would normally impact the underside of the following cutting segments 20 is disrupted and is converted to turbulent flow as indicated by the randomly directed arrows 53 along the circumference of the blade core adjacent the bond or weld zone 19. Cutting element 46 preferably extends over the entire outer periphery of its support segment to avoid exposure of blade core periphery to the swarf.

In this manner, the majority of the swarf is prevented from contacting and undercutting the following segments which trail behind each cutting element 46. By generating turbulent flow, the high kinetic energy of the laminar swarf flow is dissipated and diffused through numerous small vortices over a large area of the blade core. The velocity, quantity, and energy of the swarf impacting the blade core adjacent weld zone 19 is thus reduced and along with this reduction in the velocity, quantity, and energy of the swarf comes a reduction in blade undercutting.

Figure 7:
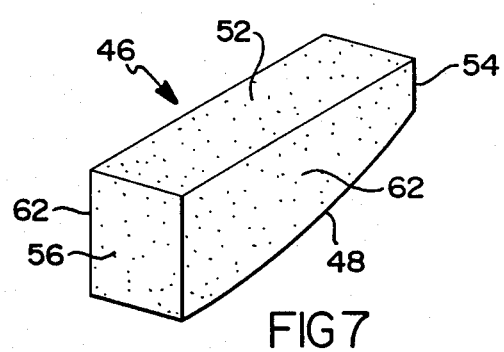
FIG. 7, which is an enlarged perspective view of the radially enlarged abrasive cutting element of FIG. 6.

Cutting element 46 is preferably designed with a trailing face 54 having a radial dimension $h_1$ at least equal to and preferably larger than the constant radial dimension h of the standard cutting segments 20 in order to block the swarf from impacting the blade core adjacent the underside of elements 20. The leading face 56 of cutting element 46 is preferably designed with a radial dimension $h_2$ greater than h and $h_1$ to provide the necessary surface profile along underside 52 (FIG. 7) to produce a turbulent flow in the outwardly spiraling swarf. While a flat planar underside profile is preferred, any shape may be employed which complements the shape of the support segments such as the arcuate profile 80 shown in phantom in FIG. 6.

While not required, it is preferable to mount cutting wheel 44 on a rotatable shaft so that the leading face 56 of cutting element 46 leads the trailing face 54 along the direction of blade rotation as indicated by directional arrow 57 in FIG. 4. When operated in this manner, the swarf will generally avoid contact with the underside 52 of cutting element 46 and thereby significantly reduce undercutting of element 46. Moreover, by sloping the underside 52 radially outwardly from the leading face 56 to the trailing face 54, a vacuum or pressure drop is created along underside 52 which further increases the turbulence of the swarf and further reduces its abrasive action. The turbulence generation and plowing effect of cutting element 46 spreads the swarf over a larger surface area 63 than that of conventional blades and thus reduces the intensity of the abrasive action of the swarf.

If the cutting wheel is operated in the opposite direction of rotation, undercutting of the cutting segments 20 is reduced but to a lesser extent and rapid undercutting along cutting element 46 occurs within the blade core region 58 which surrounds the radially inner portion of leading face 56, as shown in FIG. 4. Furthermore, less turbulence is created as a pressure drop does not occur along underside 52 when the blade is rotated in this opposite direction.

While a single cutting element 46 will provide some resistance to undercutting, it is preferable to mount 2, 3, 4 or more cutting elements at equally spaced intervals around the circumference of the cutting wheel to virtually eliminate undercutting of the blade core. The optimum number of cutting elements 46 will vary depending upon the diameter of the blade. Generally, the larger the blade diameter and blade circumference, the more cutting elements 46 will be required.

By dimensioning the leading and trailing faces 54 and 56 of the cutting element 46 with radial heights greater than the radial height h of the cutting elements 20, a greater degree of blade stability is achieved compared to the blade shown in FIG. 1. That is, a comparison of FIGS. 1 and 4 shows that in each case the respective cutting elements, 20 and 46, which have the same axial widths, are bordered on their respective sides, 60 and 62, by the walls of the kerf 40. However, greater radial contact and transverse support is provided by the planar contact between side faces 62 of cutting element 46 and the kerf than along side faces 60 of cutting element 20 and the kerf.

The greater transverse support afforded by cutting elements 46 provides greater resistance to transverse blade flexure as the greater radial heights, $h_1$ and $h_2$, provide greater leverage against transverse movement between the cutting element 46 and the kerf. By resisting transverse blade flexure, the amplitude of transverse blade vibration is decreased. As indicated above, by reducing blade vibration, blade life is increased.

Since the radial outer surface of each cutting element 46 is located on the same circle as the radial outer surface of each cutting element 20, the support segments 64 which support the cutting elements 46 must be radially recessed to accommodate the greater inward radial extent of cutting elements 46. As seen in FIG. 6, the front face 66 of each radially recessed support segment 64 has a radial dimension $h_3$ which is less than the radial dimension $h_4$ of the trailing face 68 of segment 64. Although the radially outer surface of each segment 64 is shown as a flat planar surface along support surface 70, these surfaces may be of any suitable shape which corresponds to the undersurface 52 of segment 64. Such shapes could include arcuate or polygonal shapes.

It should be mentioned that it is also important to limit the width of each gullet which, as represented in FIGS. 1 and 4, is equal to W, in order to prevent raveling and to reduce blade vibration and wear. The wider the gullet, the more aggressive is the cut and the more abrasive particles are pulled from the material being cut to cause undercutting. A satisfactory range within which the gullets should be maintained extends from about 0.050 inch to 0.500 inch while a preferred range extends from about 0.095 to 0.300 inch and an optimum range spans from about 0.125 to 0.150 inch.

The value of the radial extent h of each cutting segment 20 preferably ranges from about 0.100 inch to 0.50 inch, while the value of $h_1$ can preferably range from about 0.150 inch to 0.650 inch and the value of $h_2$ can preferably range from about 0.75 inch to 1.0 inch. The dimensions of a preferred cutting wheel are as follows:

Blade core diameter: 13.5 inch
Number of support segments: 16 (total)
Number of recessed support segments: 4
Segment arc length: 2 inches
Segment width: 0.140 inch
Thickness of blade core: 0.115 inch
Core material: 4130 steel
Gullet depth from blade core periphery: 0.650 inch
Gullet width: 0.125 inch
h: 0.250 inch
$h_1$: 0.400 inch
$h_2$: 0.650 inch
$h_3$: 0.250 inch
$h_4$: 0.500 inch Another manner of defining the preferred relative dimensions of the cutting segments 20, 46 is by expressing the radial height h of each cutting element 20 as a ratio with the height h of the trailing face 54 and with the height $h_2$ of the leading face 56. More specifically, it is advantageous to maintain the ratio $h/h_1$ within the range of about 0.30 to 0.75 and preferably within the range of about 0.60 to 0.71. It is further advantageous to maintain the ratio $h/h_2$ within the range of about 0.15 to 0.55 and preferably within the range of about 0.40 to 0.48. Dimensions held within these ranges result in high resistance to undercutting and increased blade life.

A cutting wheel constructed in accordance with the present invention will typically perform two to three times longer than conventional blades by cutting two to three times more inch-feet of concrete, masonry or the like than conventional blades. Substantially all of the material of cutting elements 20 may be used before blade replacement is required. Moreover, because of the substantially continuous contact between the cutting segment 20, 46 and the material being cut due to the narrow gullet width, green concrete may be cut without raveling much sooner than possible with conventional blades. This allows the operator to reduce the risk of concrete cracking due to curing before the stress-relieving cuts are completed.

Obviously, numerous modifications and variations of the present invention are possible in light of the above teachings. It is therefore to be understood that within the scope of the appended claims, the invention may be practiced otherwise than as specifically described herein.

What is claimed is:

1. A cutting wheel for cutting asphalt, green concrete and the like and for generating turbulent flow within a slurry formed of blade coolant and abrasive particles, said wheel comprising:

a disc-shaped blade core having a center and a predetermined width and having an outer periphery defining a plurality of circumferentially alternating gullets and support segments;

a plurality of arcuate abrasive cutting segments respectively fixed to a plurality of said support segments, said cutting segments having a predetermined radial extent; and several radially enlarged abrasive cutting segments respectively fixed to several of said support segments at spaced intervals around the circumference of said cutting wheel, said radially enlarged abrasive cutting segments having a cutting width greater than said predetermined width of said blade core for transversely stabilizing said wheel during cutting, said radially enlarged abrasive cutting segments having a radially extending leading surface and a radially extending trailing surface, said leading surface extending further radially inwardly than said trailing surface and further radially inwardly than said predetermined radial extent of said plurality of arcuate abrasive cutting segments in order to generate turbulent flow within said slurry, said radially enlarged abrasive cutting segments having a radially varying undersurface extending between said leading and trailing surfaces for creating a pressure drop within said slurry adjacent said undersurface to further generate turbulence within said slurry so as to reduce undercutting of said blade core.

* * * * *